United States Patent [19]

Bahary et al.

[11] 4,435,488

[45] Mar. 6, 1984

[54] GELLING AGENT FOR ALKALINE CELLS

[75] Inventors: William S. Bahary, Pearl River; Rowland A. Griffin, Ossining, both of N.Y.

[73] Assignee: Duracell Inc., Bethel, Conn.

[21] Appl. No.: 355,784

[22] Filed: Mar. 8, 1982

[51] Int. Cl.³ ............................................. H01M 4/62
[52] U.S. Cl. .................................... 429/212; 429/215; 429/229
[58] Field of Search ............... 429/212, 215, 206, 190, 429/229–231, 218, 219, 224

[56] References Cited

U.S. PATENT DOCUMENTS

| | | | |
|---|---|---|---|
| 3,877,983 | 4/1975 | Hovsepian | 429/212 X |
| 3,884,721 | 5/1975 | Tucholski | 429/212 X |
| 3,918,989 | 11/1975 | Gillman et al. | 429/215 X |
| 3,954,501 | 5/1976 | Rampel | 429/212 |

Primary Examiner—Anthony Skapars
Attorney, Agent, or Firm—Ronald S. Cornell; Israel Nissenbaum

[57] ABSTRACT

A novel gelling agent comprised of cross-linked CMC (carboxymethyl cellulose) is utilized as a gelling agent in the anode of alkaline electrochemical cells with improved cell performance and reduced cell gassing as compared to the commonly utilized non cross-linked CMC.

22 Claims, No Drawings

GELLING AGENT FOR ALKALINE CELLS

This invention relates to gelled anodes for alkaline electrochemical cells and more particularly to such cells having zinc anodes and CMC (carboxymethyl cellulose) gelling agents.

In order to maintain homogeneity with the anodes of alkaline cells whereby anodic materials such as amalgamated zinc powders are kept uniformly dispersed for maximum electrochemical activity, such anodes have been kept in a gelled state. The most common material utilized in forming such gelled anodes has been CMC. However, while widely utilized, such CMC gelling agents have exhibited several well recognized shortcomings. Anodes made with the CMC gelling agents tend to settle upon storage with liquid separation from the anodes and resultant loss of homogeneity and reduced cell capacity. Other drawbacks of the CMC include excessive cell gassing and transport of cell reaction products with precipitation which may result in internal cell short circuiting and reduced cell life.

It is an object of the present invention to provide a novel gelling agent for anodes of alkaline cells based upon CMC but wherein the problems inherent with CMC usage are substantially obviated. This and other objectives, features and advantages of the present invention will become more evident from the following discussion.

Generally, the present invention comprises a method of making gelled anodes for alkaline cells with the use of cross-linked CMC as a gelling agent, the anodes so formed and the cells containing such anodes. Cross-linked CMC has been widely utilized in the pharmaceutical field as being a tablet disintegrant and in contrast to non cross-linked CMC is substantially insoluble in aqueous solutions. Structurally the non cross-linked CMC utilized as a gelling agent in alkaline cells is a long chain molecule (m.w. between about 90,000–1,000,000) having repeating units:

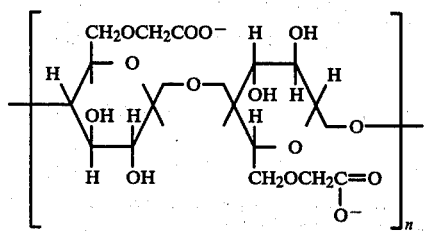

The most common form of commercially available CMC is the sodium salt and is formed by reacting alkali cellulose (made by steeping wood pulp or cotton fiber in sodium hydroxide) with sodium monochloroacetate. The resultant NaCMC has a degree of substitution of between 0.4% to 1.2% and generally about 0.7% of every 3 available substitution sites. Formation of the cross-linked CMC utilized in the present invention takes place with an additional step. After the substitution of the sodium CMC is complete, the excess sodium monochloroacetate is hydrolyzed to glycolic acid which changes a few of the sodium carboxymethyl groups to the free acid thereby catalyzing the formation of cross-linkages via a condensation reaction with resultant ester formation:

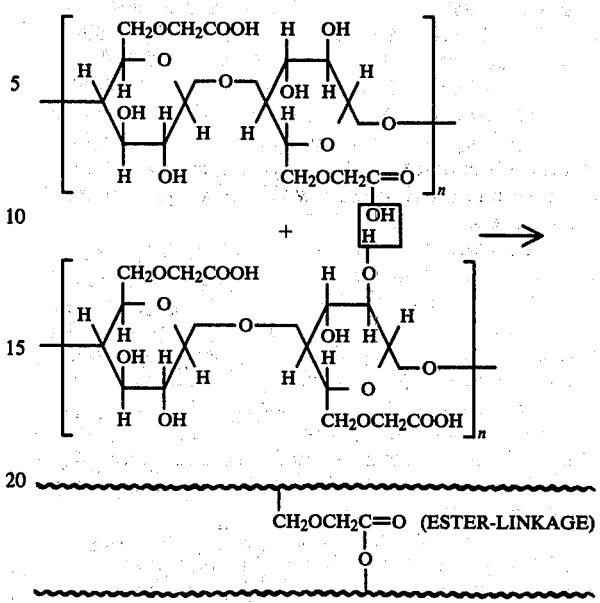

The cross-linked CMC is markedly different from the single chain non cross-linked CMC utilized as the anode gelling agent in prior art cells. The cross-linked CMC is substantially insoluble in aqueous solutions thereby providing it with greater gel strength than the non cross-linked CMC and has also been discovered to improve homogeneity on standing of anodes gelled therewith thereby improving cell performance. Additionally, the cross-linked CMC provides cells having reduced gassing and reduced incidence of short circuiting.

The degree of cross linking based upon the number of individual glucose anhydride units is between 0.01% to 10% and preferably between 0.1% to 4%. A lesser degree of cross linking provides a soluble material substantially the same as the non-cross-linked CMC. A greater degree of cross linking provides a too tightly bound molecule with little room for expansion and accomodation of water to form the desired gel.

Examples of commercially available cross-linked CMC include those designated by the trademarks CLD-2, AQUALON and Ac-Di-Sol (all sodium salts) from Buckeye Cellulose Corp., Hercules Corp. and FMC respectively.

The gelled anodes of the present invention are made in accordance with the prior art practice of either pre-gelling the anode and thereafter dispensing the gel into cells or forming the gel in situ. In the former instance, the cross-linked CMC is admixed with an active anode material such as powdered zinc or amalgamated zinc and a controlled amount of the cell electrolyte which is generally an alkaline 30–40% KOH aqueous solution. In the in situ processing, the anodic material and the cross-linked CMC are mixed and dispensed into the cell container in the dry state and then activated into a gel by the addition of the cell electrolyte. Lubricants and additives such as glycerine or polyhydric alcohols to facilitate handling and processing, may be additionally added to the anode mixture.

The amount of cross-linked CMC utilized in the gelled anode may range from about 0.5% to 7% by weight of the total anode. More preferably the effective range is between about 1.6% to 4% with the most preferred percentage being between about 2.5 to 3% by weight. Particle size of the cross-linked CMC generally ranges between −30 to −400 mesh and is preferably between −100 to −400. Of the commercially available cross-linked CMC, CLD-2 is −100 mesh, AQUALON is −60 to −325 mesh and Ac-Di-Sol is −400 mesh.

The cross-linked CMC may be utilized either alone as the sole gelling agent or in admixture with other gelling agents such as starch graft copolymers, methyl cellulose and even non cross-linked CMC with varying degrees of effectiveness.

In the present invention, the anode is a gelled mixture of the electrolyte solution and a metal in a particulate or porous form. The metal useful in the anode of the present invention can be any metal generally used in cells having an aqueous electrolyte. Such metals can include aluminum, cadmium, calcium, copper, indium, iron, lead, magnesium, manganese, mercury, nickel, tin, zinc and other metals well known in the art, used either alone or in alloys, amalgamations and admixtures. The anode metal can be used in the cell as a powder, granules or any other particulate form.

In the preferred cell, the anode metal comprises powdered amalgamated zinc. Powdered metals provide the largest exposure of anode surface area to the electrolyte. Further, the finer the anode metal powder, the greater the ability of the gel to retain the particles uniformly throughout the gel, which acts to maintain the exposure of the anode metal to the electrolyte. The preferred anode metal powder is of the order of from about 0.03 to 0.9 millimeter in diameter. The most preferred size of powder to be used depends on many factors and it can be readily determined by one skilled in the art.

The electrolyte solutions which can be gelled by the agents of the present invention, include all aqueous electrolyte solutions usable in electrochemical cells. In the preferred embodiments of the present invention alkaline electrolyte solutions are employed. These include, but are not limited to, hydroxides of alkali and alkaline earth metals. Sodium and/or potassium hydroxide are the most commonly used alkaline electrolytes.

The cross-linked CMC gelling agent of the present invention can be used with all cathodes heretofore useful in aqueous electrochemical cells. These cathodes include, but are not limited to oxidized metals, such as cadmium oxide and hydroxide, mercuric oxide, lead oxide, manganese dioxide, nickel oxide and hydroxide, silver oxide and air.

In order to more fully illustrate the efficacy of the present invention the following examples are presented. It is understood, however, that such examples are illustrative in nature and any enumeration of detail therein should not be construed as limitations on the present invention. Unless otherwise indicated, all parts are parts by weight.

EXAMPLES 1-9

Three zinc anode powder blends were made using 2500 gm zinc powder, 188 gm HG, 0.25% acetic acid (percentage based upon the Zn+Hg weight); and water, glycerin and cross-linked CMC in the amounts and of the character given in Tables I, II and III below. Fifteen "D" size cells were then made from each of the blends with each cell being comprised of about 18.4 grams of the zinc anode powder blend as the anode, about 15 $cm^3$ of 40% KOH aqueous solution as electrolyte and $MnO_2$ standard depolarizer powder and separator with the cells being anode limited. Five cells of each anode blend were discharged fresh at 2¼ ohms, five cells at 2¼ ohms after one week storage at 130° F. (54.4° C.) and the remaining five fresh at 10 ohms with the results given in Tables I, II and III respectively:

TABLE I

*(2¼ Ω - Fresh)

| Example No. (5 cells ea.) | Anode Blend | Type of Cross-linked CMC & % | % Glycerine | % $H_2O$ | Discharge hours to cutoff volts | | | | | % Zinc utilization |
|---|---|---|---|---|---|---|---|---|---|---|
| | | | | | 1.1 | 1.0 | 0.9 | 0.8 | 0.65 | |
| 1 | A | Aqualon SPX1148 2.0 | 0.25 | 0.25 | 7.1 | 11.3 | 15.1 | 19.7 | 24.5 | 78.2 |
| 2 | B | CLD-2 2.5 | 0.25 | 0.25 | 7.8 | 12.3 | 15.9 | 19.8 | 24.3 | 78.3 |
| 3 | C | Ac-Di-Sol 3.0 | 0.35 | 0.35 | 6.8 | 11.4 | 14.8 | 18.0 | 20.6 | 69.5 |

*Percentages based on total Zn & Hg weight. Results given are averages.

TABLE II

*(2¼ Ω - 130° F. storage for week)

| Example No. 5 cells ea) | Anode Blend | Type of Cross-linked CMC & % | % Glycerine | % $H_2O$ | Discharge hours to cutoff volts | | | | | % Zinc utilization |
|---|---|---|---|---|---|---|---|---|---|---|
| | | | | | 1.1 | 1.0 | 0.9 | 0.8 | 0.65 | |
| 4 | A | Aqualon SPX1148 2.0 | 0.25 | 0.25 | 6.0 | 10.2 | 13.8 | 17.6 | 21.9 | 69.6 |
| 5 | B | CLD-2 2.5 | 0.25 | 0.25 | 6.2 | 10.6 | 14.4 | 17.8 | 21.4 | 68.9 |
| 6 | C | Ac-Di-Sol 3.0 | 0.35 | 0.35 | 7.1 | 11.3 | 14.8 | 18.1 | 20.4 | 68.0 |

TABLE III

| Example No. (5 cells ea) | Anode Blend | Type of Cross-linked CMC & % | % Glycerine | % H₂O | *(10Ω Fresh) Discharge hours to cutoff volts | | | | | % zinc utilization |
| --- | --- | --- | --- | --- | --- | --- | --- | --- | --- | --- |
| | | | | | 1.1 | 1.0 | 0.9 | 0.8 | 0.65 | |
| 7 | A | Aqualon SPX1148 2.0 | 0.25 | 0.25 | 57.6 | 70.8 | 84.6 | 108.0 | 117.4 | 93.7 |
| 8 | B | CLD-2 2.5 | 0.25 | 0.25 | ** | 76.7 | 88.2 | 106.5 | 117 | 99.1 |
| 9 | C | Ac-Di-Sol 3.0 | 0.35 | 0.35 | 60.6 | 74.6 | 87.0 | 105.4 | 115.2 | 94.3 |

*Percentages based on total Zn & Hg weight. Results given are averages.
**Not recorded.

The cross-linked CMC provides cells having improved discharge capability compared to the prior art non-cross-linked CMC. Cells made with anodes gelled with the cross-linked CMC are comparable to cells having anodes gelled with starch-graft-copolymers such as SGP which have been shown to be superior to the non-cross-linked CMC. However, the cross-linked CMC gelling agent of the present invention has an advantage over the starch-graft-copolymer in that it can be more effectively utilized in button type cells such as those containing silver oxide anodes. The cross-linked CMC of the present invention does not contain any ammonia (a residual product found in starch-graft-copolymers) which may detrimentally react with the silver oxide commonly used as the depolarizer in button cells.

It is understood that the above examples are merely illustrative of the present invention and that different formulations and ratios of components as well as the actual components themselves may provide different results under varying conditions. However, changes in cell components and component ratios are within the scope of the present invention as defined in the following claims.

What is claimed is:

1. A method of gelling anodes for alkaline cells comprising the step of gelling an anode active material with cross-linked carboxymethyl cellulose and an alkaline electrolyte solution.

2. The method of claim 1 wherein said anode active material is comprised of zinc.

3. The method of claim 1 wherein said alkaline electrolyte solution is comprised of a KOH solution.

4. The method of claim 1 wherein the degree of cross linking in said cross-linked carboxymethyl cellulose is between 0.01 to 10% based upon the number of individual glucose anhydride units therein.

5. The method of claim 4 wherein said degree of cross linking is between 0.1 to 4%.

6. The method of claim 1 wherein said alkaline cells contain cathodes comprised of a member of the group consisting of manganese dioxide, silver oxide and mercury oxide.

7. The method of claim 1 wherein said cross-linked carboxymethyl cellulose comprises between 0.5% to 7% by weight of said anode.

8. The method of claim 7 wherein said cross-linked carboxymethyl cellulose comprises between 1.6% to 4% by weight of said anode.

9. An anode blend for an electrochemical cell comprising an anode active powder and cross-linked carboxymethyl cellulose.

10. The anode blend of claim 8 wherein said active anode powder is comprised of zinc.

11. The anode blend of claim 10 wherein said blend further includes an aqueous KOH solution.

12. The anode blend of claim 10 wherein the degree of cross linking of said cross-linked carboxymethyl cellulose is between 0.01 to 10% based upon the number of individual glucose anhydride units therein.

13. The anode blend of claim 12 wherein said degree of cross linking is between 0.1 to 4%.

14. The anode blend of claim 9 wherein said cross-linked carboxymethyl cellulose comprises between 2.5% to 3% by weight of said anode blend.

15. An electrochemical cell comprising a gelled anode, a cathode and an aqueous alkaline electrolyte characterized in that said gelled anode contains cross-linked carboxymethyl cellulose.

16. The cell of claim 15 wherein said anode contains zinc as the active material thereof.

17. The cell of claim 16 wherein said aqueous alkaline electrolyte is comprised of a KOH solution.

18. The cell of claims 15, 16 or 17 wherein said cathode is comprised of a member of the group consisting of manganese dioxide, silver oxide and mercury oxide.

19. The cell of claim 15 wherein the degree of cross linking in said cross-linked carboxymethyl cellulose is between 0.01 to 10% based upon the number of individual glucose anhydride units therein.

20. The cell of claim 19 wherein said degree of cross linking is between 0.1 to 4%.

21. The cell of claim 15 wherein said cross-linked carboxymethyl cellulose comprises between 0.5% to 7% by weight of said anode.

22. The cell of claim 21 wherein said cross-linked carboxymethyl cellulose comprises between 1.6% to 4% by weight of said anode.

* * * * *